United States Patent

[11] 3,593,209

[72] Inventor Norman C. Gittinger
Schenectady, N.Y.
[21] Appl. No. 888,799
[22] Filed Dec. 29, 1969
[45] Patented July 13, 1971
[73] Assignee General Electric Co.

[54] HYBRID FILTER FOR TWO-WAY TRANSMISSION OVER A SINGLE LINE
7 Claims, 5 Drawing Figs.

[52] U.S. Cl. .......... 333/11, 333/70 R, 333/75
[51] Int. Cl. .......... H01p 5/12, H03h 7/04
[50] Field of Search .......... 333/11, 10, 70, 75, 1, 6; 179/15; 178/5

[56] References Cited

UNITED STATES PATENTS

| | | | |
|---|---|---|---|
| 1,413,357 | 4/1922 | Raibourn | 333/70 X |
| 2,938,084 | 5/1960 | Autrey | 333/11 X |
| 2,974,188 | 3/1961 | Diambra | 333/35 X |
| 3,017,584 | 1/1962 | Lundry | 333/6 |
| 3,089,004 | 5/1963 | Oswald | 333/11 X |

*Primary Examiner*—Herman Karl Saalbach
*Assistant Examiner*—Marvin Nussbaum
*Attorneys*—John F. Ahern, Paul A. Frank, Julius J. Zaskalicky, Frank L. Neuhauser, Oscar B. Waddell and Joseph B. Forman

ABSTRACT: A hybrid filter is disclosed wherein the characteristics of a hybrid coupler and high and low pass filters are combined. Each port of the hybrid filter exhibits a constant input impedance that is independent of frequency. The hybrid filter provides a common, low pass and a high pass port, thus providing both frequency and power isolation between branches.

Inventor:
Norman C. Gittinger,
by Paul A. Frank
His Attorney.

Inventor:
Norman C. Gittinger,
by Paul A. Frank
His Attorney.

HYBRID FILTER FOR TWO-WAY TRANSMISSION OVER A SINGLE LINE

HYBRID FILTER FOR TWO-WAY TRANSMISSION OVER A SINGLE LINE

In cable TV systems, and elsewhere, the attenuation characteristics of the media over which a signal is transmitted make it necessary to utilize amplifiers at strategic locations along the transmission path. Since signals may be travelling in both directions over a single path in CATV systems, some means is necessary for separating the signals according to direction of travel and separately amplifying the signals travelling in each direction. One technique for separating the signals is to use different frequency bands for each direction and utilizing filters for separating the signals. However, if only filters are employed, problems may arise with oscillations at the amplification station due to the fact that the amplifiers are improperly terminated over part of the frequency range, as well as being connected output to input thereby forming a closed loop having gain greater than one at some frequency. To overcome this difficulty, the amplifiers for each direction must be power isolated from each other and, in addition, be properly terminated (loaded) at all frequencies.

In view of the above, it is therefore an object of the present invention to provide a system wherein signals travelling in two directions over a single transmission path may be power isolated and separately amplified.

It is a further object of the present invention to provide a device combining the functions of a three-port branching filter and a hybrid power divider.

It is another object of the invention to provide a hybrid filter in which all the ports of the filter exhibit a constant input impedance equal to the characteristic impedance of the filter and independent of operating frequency.

It is yet a further object of the invention to provide a branch filter in which opposed ports are completely isolated.

The foregoing objects are achieved by the present invention which, in its simplest form, provides a four-port bridge circuit having a common, a low pass, and a high pass port. The fourth port contains an inverting transformer and an internal resistance connecting the input and output of the inverting transformer. The filters connecting the ports and the transformer-resistance combination give the system its ability to separate and power isolate the signals.

The various features and advantages of the present invention may best be understood by considering the following description in conjunction with the attached drawings in which.

Figure 1:
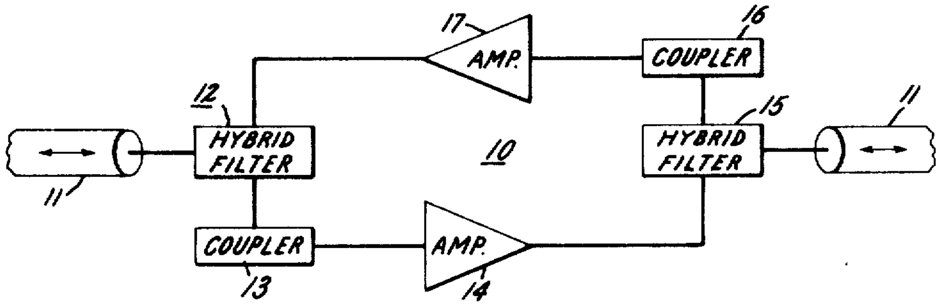
FIG. 1 illustrates an amplifying station employing the present invention in a two-way transmission path.

Referring to FIG. 1, there is shown an amplifying station 10 in which the hybrid filter of the present invention may be used. In the amplifying station the signals travelling in each direction are separated and amplified, then recombined for further transmission. In the amplifying station shown in FIG. 1 the signals are received or transmitted over transmission lines 11, shown in FIG. 1 as coaxial cable. A first hybrid filter 12, for example, will receive signals travelling from left to right and separate them into two channels, according to the frequencies of the signals involved. If, for example, low frequency signals are travelling from left to right, they will be channeled by the hybrid filter 12 through coupler 13 to amplifier 14 where the signal strength is increased for further transmission. The low frequency signals are then coupled through a second hybrid filter 15 to a further transmission line 11. High frequency signals, travelling in the right to left direction, are separated by hybrid filter 15, passed through coupler 16 to amplifier 17, where the signal strength is increased for further transmission through the first hybrid filter 12 and transmission line 11. Hybrid filters 12 and 15, which may be identical to each other, serve to isolate the two amplifying halves of the station from each other. Couplers 13 and 17 are merely representative of any necessary coupling apparatus.

As can be seen from FIG. 1, the amplifying station can comprise a closed loop were it not for the power isolation provided by the hybrid filters 12 and 15. In a hybrid filter built in accordance with the present invention, the two side branches are electrically isolated from each other and yet provide coupling to a common branch in the nature of a hybrid coupler. Thus, in FIG. 1, the hybrid filter 12 isolates the signals in each channel from each other and yet combines them at its common terminal from the transmission lines 11.

Figure 2:
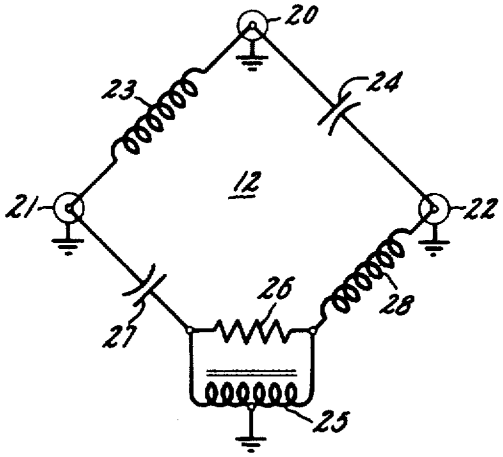
FIG. 2 illustrates a hybrid filter according to the present invention having a gradual cutoff characteristic.

FIG. 2 illustrates a specific form of hybrid filter built in accordance with the present invention and suitable for use in the amplifying station as shown in FIG. 1. The hybrid filter 12 is basically a bridge circuit having a common port 20 and side ports 21 and 22. The side ports 21 and 22 are isolated from each other by virtue of the filter elements connected between the ports and also by virtue of a phase inverting element connected directly between side ports 21 and 22.

The hydrid filter 12 comprises a common port 20 connected to a first side port 21 by an inductive impedance element 23. The common port 20 is further coupled to a second side port 22 by a capacitive impedance element 24. The two side ports are further connected by what may be considered a complementary filtering and phase inverting circuit comprising capacitor 27, inductor 28, center-tap transformer 25, and resistor 26. The center-tap transformer serves to phase invert any signal passing therethrough. The resistance 26 has its value four times the value of the design impedance.

A complementary filtering action is obtained by elements 25 through 28 by virtue of the fact that the side port 21 is coupled through a capacitor to the phase inverter 25 and thence through an inductor 28 to the other side port whereas on the other half of the circuit the side port 21 is connected to the side port 22 first through an inductor and then through a capacitor. The port 21 forms the low pass port since low frequency signals will be readily passed by the inductor 23 to the common port 20. If high frequency signals should appear at side port 21, they will be passed through capacitor 27 to the phase inverting transformer 25 and attenuated by the inductor 28. However, any high frequency signals that should pass through inductor 23 or 28 will cancel out at port 22 because the signals coming by way of inductor 28 are phase inverted relative to the signals coming by way of inductor 23, In the same manner, the phase inverter serves to cancel out low frequency signals that might appear at port 22 and are not desired at port 21.

The specific values of the components of FIG. 2 are determined as follows: Element 26 has a value of 4R, where R is the characteristic impedance of the hybrid filter and of the transmission line to which it is connected. Assigning each inductor 23 and 28 a valve $L$ and each capacitor a value $C$, $L$ and $C$ are related as follows: $L=2R^2C$. $L$ and $C$ are determined from the crossover frequency $f_c$ by the well-known resonance equation: $f_c=[2\pi(LC)^{1/2}]**-1$.

Figure 3:
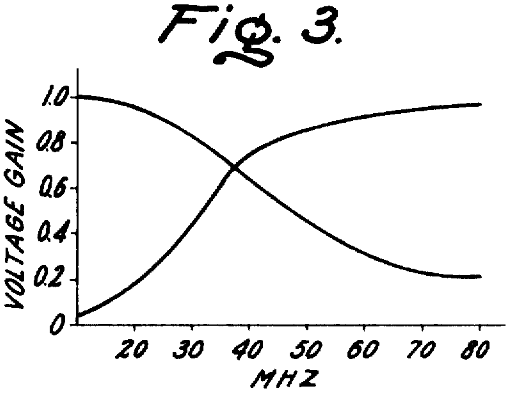
FIG. 3 illustrates the overall response of the hybrid filter illustrated in FIG. 2.

In FIG. 3 there is illustrated the frequency response of filters utilized in the simple hybrid filter 12 illustrated in FIG. 2. As can be seen from FIG. 3, the filters used have a gradual rolloff characteristic.

If sharper frequency response is desired, a more complex filtering element can be utilized between the ports of the bridge. Such a system is shown in FIG. 4 wherein ports are connected by the high pass and low pass "T" filters.

Figure 4:
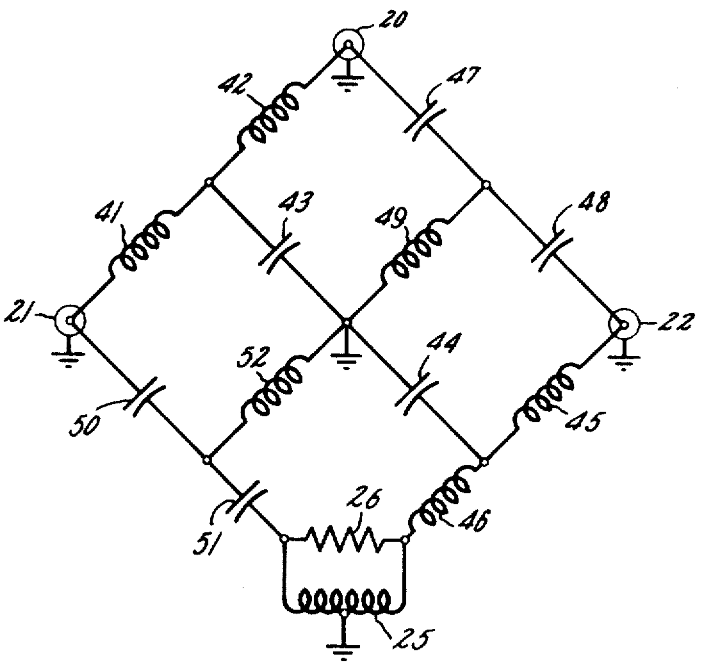
FIG. 4 illustrates another embodiment of the invention wherein a sharp cutoff hybrid filter is provided.

In FIG. 4, there is shown a modified hybrid filter 12′ comprising common port 20 and side ports 21 and 22. Phase inverting and impedance matching elements 25 and 26 are carried over from the simple hybrid filter illustrated in FIG. 2. Connecting the common and side ports and the phase inverting elements in FIG. 4 are high pass and low pass T filters. Connecting the common port 20 with the low pass side port 21 is a low pass T filter comprising series connected inductances 41 and 42 and a shunt capacitance 43. Connecting the common port 20 with the high pass port 22 is a high pass T filter comprising series connected capacitances 47 and 48, and a shunt inductance 49. In the lower half of the bridge, side port 21 is connected to phase inverter 25 by a high pass T filter comprising series connected capacitances 50 and 51 and a shunt inductance 52. Side port 22 is connected to phase inverter 25 by a low pass T filter comprising series connected inductances 45 and 46 and having a shunt capacitance 44. The overall operation of the modifies hybrid filter 12' is the same as that of the simple hybrid filter illustrated in FIG. 2. High frequency signals appearing at terminal 20 are passed to the high pass port 22 by the capacitances 47 and 48 which show a relatively low impedance to the high frequency signals. In a similar manner, low frequency signals appearing at the common port 20 are passed to the low pass port 21 by inductances 41 and 42 which present a relatively low impedance to the low frequency signals. The inductance 49 in the high pass side of the bridge shunts any low frequency signals to ground as they pass through the high pass T filter and in a similar manner the shunt capacitance 43 in the low pass T filter connecting ports 20 and 21 will shunt any high frequency signals passing through the filter to ground. Any signals appearing at port 21 will not be coupled to port 22, and vice versa by virtue of the inverting transformer 25. As described above, phase inverter 25 inverts the signals so that signals at one side port are cancelled out at the other. Impedance match is maintained by virtue of the resistance 26 which has the same value as given before, that is, its resistance value is four times the impedance value of the circuit.

Hybrid filters constructed in accordance with the present invention have the added feature of presenting a constant input impedance equal to the characteristic impedance of the filter regardless of the operating frequency. This is true provided that the respective ports 20, 21, and 22 are terminated in the characteristic impedance, a condition usually met in practice. By way of example, the relative values of the elements in FIG. 4 are as follows: If each of the inductors about the periphery of the bridge is assigned as value $L$, the inductors on the stem portions of the high pass T filters must then have a value of $KL$, where $K$ has a value of 0.34444. If the capacitors about the periphery of the bridge are assigned a value $C$, the capacitors on the stem portion of the low pass filters will have the value of $C/K$, where $K$ is the same $K$ as used with the inductors. The values of $L$ and $C$ are related by the equation $L=2.45163\ R^2C$. The operating frequency of the bridge is determined from the well-known resonance equation wherein $f=[2\pi(LC)^{1/2}]-1$.

Figure 5:
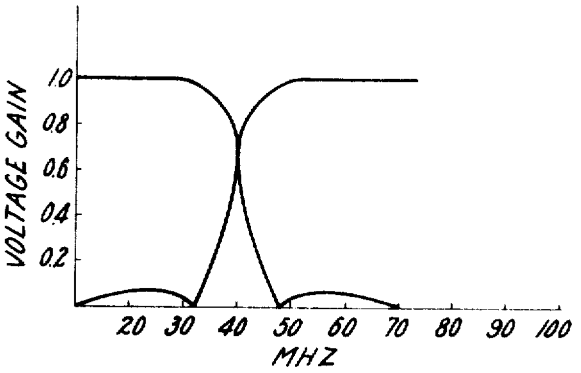
FIG. 5 illustrates the response curves for the hybrid filter as illustrated in FIG. 4.

The overall response of the bridge constructed as shown in FIG. 4 is illustrated in FIG. 5. It can be seen that the frequency response of the bridge of FIG. 4 is much sharper than that of FIG. 2 by virtue of the more complex filters used in the embodiment of FIG. 4.

Thus, it can be seen that there is provided by the present invention a hybrid filter network combining the desirable features of the hybrid coupler with those of a branch filter and having the characteristic that a signal applied to a common port will be transferred to either a high pass or a low pass port without loss, depending upon the signal frequency, assuming the signal frequency is not in the crossover range of the response characteristics of the filter. A hybrid filter according to the present invention also has the feature that the constant input impedance equals the filter characteristic impedance and is always presented, regardless of operating frequency, providing that the ports are terminated in the characteristic impedance of the system. Further, the hybrid filter provides theoretically infinite attenuation at all frequencies between the high and low pass side ports. It should be noted that the specific form of filter used in the present invention is not critical, but rather it is merely the arrangement of the filters with the phase inverter and the filter values that gives these unique results. Various modifications will be apparent to those skilled in the art in accordance with the teachings of the present invention. For example, the fourth port of the bridges shown in FIGS. 2 and 4 may be completed for connection to a transmission line by eliminating the internal resistance 26 and adding a secondary to the center-tapped primary of transformer 25. The port connected to the secondary must also be loaded by the design impedance of the bridge. The fourth port would then function as a second common port in the manner of port 20.

What I claim as new and desire to secure by Letters Patent of the United States is:

1. A hybrid filter comprising:
a common first port,
a low pass second port,
a high pass third port, said first, second and third ports each having a signal terminal and a common terminal,
first filter means having a low frequency band pass response and connecting said first port to said second port,
second filter means having a band-pass response of substantially higher frequency than that of said first filter means and connecting said first port to said third port, and
complementary filtering and phase inverting means connecting said second port to said third port and forming a bridge circuit including said first, second, and third ports, said first and second filter means and said complementary filtering and inverting means providing high signal attenuation between said second and third ports and thereby providing both frequency and power isolation therebetween.

2. A hybrid filter as set forth in claim 1 wherein said first first filter means comprises inductive reactive means; and
said second filter means comprises capacitive reactive filter means.

3. A hybrid filter as set forth in claim 1 wherein said first and second filter means comprise low pass and high pass T filters, respectively.

4. A hybrid filter as set forth in claim 1 wherein said complementary filtering and phase inverting means comprises:
third filter means having characteristics like said second filter means and coupling said phase inverting means to said second port; and
fourth filter means having characteristics like said first filter means and coupling said phase inverting means to said third port.

5. A hybrid filter as set forth in claim 4 wherein:
said first and fourth filter means comprise series inductive reactive means,
said second and third filter means comprise series capacitive reactive means, the value of the inductive reactive means $L$ and capacitive reactive means $C$ being related as $L=2R^2C$ where $R$ is the characteristic impedance of the hybrid filter and of a transmission line to which it is adapted to be connected, and
said phase inverting means comprises a center-tapped transformer having its center-tap for connection as a fourth port of said hybrid filter.

6. A hybrid filter as set forth in claim 5 wherein:
said center-tapped transformer has two signal leads in addition to said center-tap, on of said signal leads being connected to said third filter means and the other of said signal leads being connected to said fourth filter means, and further comprising:
resistance means of predetermined value connected across said center-tapped transformer by means of said two signal leads, the value of said resistance means equal to $4R$, each port of the hybrid filter presenting a constant input impedance that is independent of operating frequency.

7. A hybrid filter as set forth in claim 5 wherein:
said inverting means further comprises a secondary winding on said center-tapped transformer for connection as a fourth port of said hybrid filter.

Disclaimer 3,593,209.—*Norman C. Gittinger,* Schenectady, N.Y. HYBRID FILTER FOR TWO-WAY TRANSMISSION OVER A SINGLE LINE. Patent dated July 13, 1971. Disclaimer filed May 11, 1983, by the assignee, *General Electric Co.*

Hereby enters this disclaimer to claims 1, 2, 3 and 4 of said patent.

[*Official Gazette October 11, 1983.*]